United States Patent
Goulay et al.

(10) Patent No.: US 8,500,168 B2
(45) Date of Patent: Aug. 6, 2013

(54) ENERGY ABSORPTION POSITION-KEEPING DEVICE IN AN AUTOMOTIVE VEHICLE STEERING COLUMN

(75) Inventors: Pascal Goulay, Vendome (FR); Nicolas Genet, Vendome (FR)

(73) Assignee: ZF Systemes de Direction Nacam, S.A.S., Vendome (FR)

( * ) Notice: Subject to any disclaimer, the term of this patent is extended or adjusted under 35 U.S.C. 154(b) by 345 days.

(21) Appl. No.: 12/599,168

(22) PCT Filed: Mar. 26, 2008

(86) PCT No.: PCT/FR2008/050526
§ 371 (c)(1),
(2), (4) Date: Feb. 27, 2010

(87) PCT Pub. No.: WO2008/142312
PCT Pub. Date: Nov. 27, 2008

(65) Prior Publication Data
US 2010/0300236 A1     Dec. 2, 2010

(30) Foreign Application Priority Data

May 11, 2007  (FR) ...................................... 07 03435

(51) Int. Cl.
*B62D 1/00*     (2006.01)

(52) U.S. Cl.
USPC ........................................... 280/777; 74/493

(58) Field of Classification Search
USPC ........ 74/493, 94, 95, 492, 494, 495; 280/777, 280/775
See application file for complete search history.

(56) References Cited

U.S. PATENT DOCUMENTS

| | | | | |
|---|---|---|---|---|
| 2,852,956 A | * | 9/1958 | May ................................. | 74/493 |
| 3,457,800 A | * | 7/1969 | Suda et al. ..................... | 74/492 |
| 3,461,740 A | * | 8/1969 | Moriya et al. .................. | 74/492 |
| 3,938,821 A | * | 2/1976 | Haas et al. ..................... | 280/777 |
| 4,463,626 A | * | 8/1984 | Kazaoka et al. ............... | 74/493 |
| 4,648,164 A | * | 3/1987 | Hyodo et al. ................ | 29/894.1 |
| 4,733,575 A | * | 3/1988 | Nakamura ..................... | 74/493 |
| 5,052,240 A | * | 10/1991 | Miyoshi et al. ................ | 74/493 |
| 5,409,261 A | * | 4/1995 | Yamaguchi .................... | 280/775 |
| 5,524,927 A | * | 6/1996 | Toussaint ..................... | 280/777 |
| 5,537,890 A | * | 7/1996 | Thomas ......................... | 74/493 |
| 5,562,307 A | * | 10/1996 | Connor ......................... | 280/777 |
| 5,595,399 A | * | 1/1997 | Fouquet et al. ............... | 280/777 |

(Continued)

FOREIGN PATENT DOCUMENTS

| | | |
|---|---|---|
| EP | 0 440 403 A1 | 8/1991 |
| EP | 0 755 842 A1 | 1/1997 |

(Continued)

*Primary Examiner* — David M Fenstermacher
*Assistant Examiner* — Alexander Vu
(74) *Attorney, Agent, or Firm* — Lawrence E. Laubscher, Sr.; Lawrence E. Laubscher, Jr.

(57) ABSTRACT

In an adjustable steering column adjustable, a steering shaft is mounted in a body tube arranged in an intermediate carrier mounted on a fixed support member. The body tube is immobilized onto the fixed support member by a clamping system. The position-keeping device includes teeth that, in the event of an impact, are mutually engageable by means of a press system mounted in the intermediate carrier and under the action of the clamping system. The teeth belong to of the press system and are on the body tube. The teeth have characteristics defined such that in the event of an impact, the breaking force of the teeth has a predetermined value.

18 Claims, 9 Drawing Sheets

U.S. PATENT DOCUMENTS

| | | | |
|---|---|---|---|
| 5,722,299 A * | 3/1998 | Yamamoto et al. | 74/493 |
| 5,743,150 A * | 4/1998 | Fevre et al. | 74/493 |
| 6,039,350 A | 3/2000 | Patzelt | |
| 6,053,067 A * | 4/2000 | Garnault et al. | 74/492 |
| 6,092,955 A * | 7/2000 | Chartrain et al. | 403/283 |
| 6,092,957 A * | 7/2000 | Fevre et al. | 403/373 |
| 6,131,481 A * | 10/2000 | Wilson et al. | 74/493 |
| 6,390,717 B1 * | 5/2002 | Bar | 403/104 |
| 6,792,824 B2 * | 9/2004 | Jolley et al. | 74/493 |
| 6,799,486 B2 * | 10/2004 | Manwaring et al. | 74/493 |
| 7,635,149 B2 * | 12/2009 | Menjak et al. | 280/775 |
| 7,677,133 B2 * | 3/2010 | Matsui et al. | 74/493 |
| 2001/0035664 A1 * | 11/2001 | Steffens et al. | 296/100.09 |
| 2005/0199087 A1 * | 9/2005 | Li et al. | 74/493 |
| 2006/0156856 A1 * | 7/2006 | Camp | 74/493 |
| 2009/0229399 A1 * | 9/2009 | Ozsoylu et al. | 74/493 |
| 2010/0300236 A1 * | 12/2010 | Goulay et al. | 74/493 |

FOREIGN PATENT DOCUMENTS

| | | |
|---|---|---|
| EP | 0 849 141 A1 | 6/1998 |
| EP | 1 464 560 A3 | 10/2004 |
| EP | 1 464 560 A8 | 10/2004 |
| EP | 1464560 * | 10/2004 |

* cited by examiner

ENERGY ABSORPTION POSITION-KEEPING DEVICE IN AN AUTOMOTIVE VEHICLE STEERING COLUMN

RELATED APPLICATIONS

This application is a continuation of the PCT International Application No. PCT/FR2008/050526 filed Mar. 26, 2008, which is based on the French Application No. 0703435 filed May 11, 2007.

BACKGROUND OF THE INVENTION

1. Field of the Invention

The present invention relates to a position-keeping device with energy absorption capabilities in the event of an impact, which is to be mounted on an automotive vehicle steering column.

The device according to the invention is applicable to a steering column whose depth or height is adjustable or to a steering column whose depth and height are both adjustable, and whose steering shaft is mounted in a body tube which is carried and immobilized onto the structure of the vehicle in the required position. Thus, the steering column includes a steering shaft rotatably mounted into the body tube, which is linked to a support assembly fastened to the vehicle chassis or to a member of the vehicle body.

2. Description of the Related Art

The different types of automotive vehicle steering column must have more and more security as regard to position keeping.

Nevertheless, the known mounting types of the steering shaft do not allow for taking part as required in the energy absorption in the event of an impact.

SUMMARY OF THE INVENTION

The object of the present invention is to provide a position-keeping device for a steering column body tube which avoids the above described drawbacks, i.e. in the event of an impact the keeping device embodying the invention allows for energy absorption to be time controlled at the different requested values.

The invention relates to an energy absorption position-keeping device in an automotive vehicle steering column adjustable in depth and/or height, which includes a steering shaft rotatably mounted about a steering axis in a body tube. Said steering column is mounted in a support assembly including a fixed support member and a movable support member. Said body tube is arranged in the movable support member and immobilized onto the fixed support member, in a locked position, by a clamping system along a clamping axis substantially perpendicular to the vertical steering plane passing through the steering axis.

In the event of an impact, the body tube is movable with respect to an intermediate carrier which is fixed, the body tube and the intermediate carrier making up the movable support member. The movable support member allows for the height to be adjusted with respect to the fixed support member. The body tube is movable with respect to the intermediate carrier for the depth to be adjusted and in the event of an impact.

Said position-keeping device, in the event of an impact, includes:
 a movable meshing face connected to said body tube,
 a fixed meshing face connected to said intermediate carrier,
 the two meshing faces being substantially parallel to the steering axis, i.e. to the movement in the event of an impact,
 the two meshing faces are engaged with each other by means of protrusions arranged on each of the two faces to provide for position keeping in a locked position,
 the direction of protrusions being substantially perpendicular to the moving direction in the event of an impact, i.e. to the steering axis,
 the protrusions of the movable meshing face having a profile along the vertical plane, which is conjugated with the profile of the protrusions of the fixed meshing face,
 the protrusions having shape, size and material characteristics which are defined so that in the event of an impact, the breaking force value of the protrusions corresponds to a strain at the beginning of the retraction stroke that has a predetermined value.

According to the invention, the position-keeping device includes a system for pressing the meshing faces one against the other, which mutually engageable by means of the clamping system, so as to act in a locked position on the meshing faces and to move said meshing faces away from each other in an unlocked position.

According to an embodiment of the invention, the fixed meshing face connected to the intermediate carrier is arranged on a keeping member which is mounted in said intermediate carrier. The movable meshing face connected to the body tube is directly arranged on a face of said body tube. The clamping system includes a clamping rod the axis of which is the clamping axis, and which is mounted in the fixed support member and in the intermediate carrier. Said clamping rod passes through and is engaged with the keeping member by means of a pressing system, a so-called press system.

Advantageously according to the invention, the press system comprises an elastic member and a return member.

The elastic member, made up of a spring, on the one hand bears in a housing of the intermediate carrier, and on the other hand, acts on the keeping member in a locked position to apply the meshing faces one against the other. The return member moves the meshing faces away from each other in an unlocked position.

The return member is made up of a cam integral with the clamping rod and arranged in a housing of the keeping member. The vertical profiles of the housing and the cam are determined so that in an unlocked position, the cam acts against the housing by compressing the spring and moves the meshing faces away from each other, and in a locked position, the cam moves away from the housing and allows the spring to act on the meshing faces which enter one into the other. The cam is integral with the clamping rod through a square section fitting passing through the keeping member, or by any other means.

According to different alternatives of the invention, the elastic member is made up of a spring including a base with two or four side branches that bear in the housing of the intermediate carrier, and by two centre branches acting on two bearing faces of the keeping member.

In other embodiments, the elastic member is made up of one coiled spring or plural coiled springs, or by one elastic washer or plural elastic washers, bearing in the housing of the intermediate carrier and acting on the keeping member.

In a particularly interesting embodiment of the invention, the protrusions of the two meshing faces are in the shape of teeth that are meshed with each other in a locked position, the direction of the teeth being substantially perpendicular to the steering axis. The teeth have along the vertical plane a profile, which comprises an upright flank substantially perpendicular to the plane of the corresponding meshing face, and a flank sloping with respect to said plane of the meshing face; or of two flanks sloping with respect to the plane of the corresponding meshing face. Moreover, the apex of each tooth consists in a rounded portion between the upright or sloping flank and the sloping flank for the teeth to enter one into the other more easily, and the bottom of teeth consists in a rounded portion between the sloping flank of a tooth and the upright or sloping flank of the contiguous tooth.

In the architecture of the invention, the clamping system includes:
the clamping rod which is mounted in the fixed support member and passes through the intermediate carrier,
an immobilizing assembly, an operating lever and an axial holding member, which are mounted on one of the ends of the clamping rod and arranged on one side of the vertical steering plane and outside the support assembly,
an axial holding member which is mounted on the other end of the clamping rod and arranged on the other side of the vertical steering plane and outside the support assembly.

In said architecture, the support assembly of the steering column includes:
the fixed support member, which is made up of two uprights connected by a connecting member, the two uprights being substantially parallel to the vertical steering plane;
the intermediate carrier, which is longitudinally bifurcated and is made up of two uprights connected by a closing member; the two uprights being substantially parallel to the vertical steering plane and having upper connecting portions, the intermediate carrier being mounted inside and between the two uprights of the fixed support member, the connecting portions of the intermediate carrier defining an axial slot wide enough to make it easier for the connecting portions to move closer upon clamping;
the clamping rod being mounted in the two uprights of the fixed support member, and going through the two uprights of the intermediate carrier, the immobilizing assembly with the operating lever and the axial holding member being arranged outside and against the external face of one of the uprights of the fixed support member, the other axial holding member being arranged outside and against the external face of the other upright of the fixed support member;
the body tube, which comprises two uprights connected by a connecting member and by a closing member, the two uprights being substantially parallel to the vertical steering plane, the body tube being mounted inside and between the two uprights of the intermediate carrier.

BRIEF DESCRIPTION OF THE DRAWINGS

Further features and advantages of the present invention will become more clearly apparent on reading the following description of several preferred embodiments of the invention, given by way of nonlimiting examples, with reference to the corresponding appended drawings, in which.

DETAILED DESCRIPTION OF THE INVENTION

Figure 1:
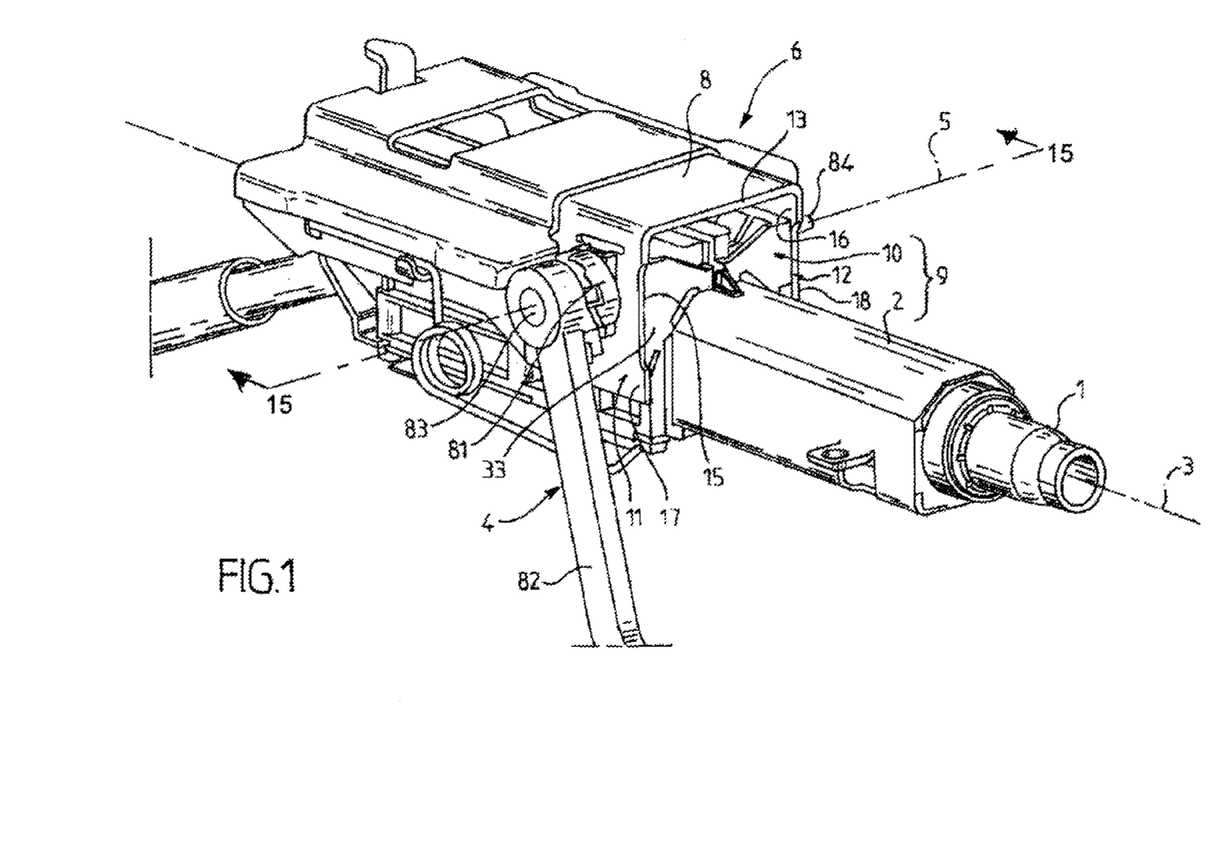
FIG. 1 is a perspective view of the top part of an automotive vehicle steering column including an embodiment of a energy absorption position-keeping device of the invention, with the steering wheel and the column bearing structure being not shown.
Figure 13:
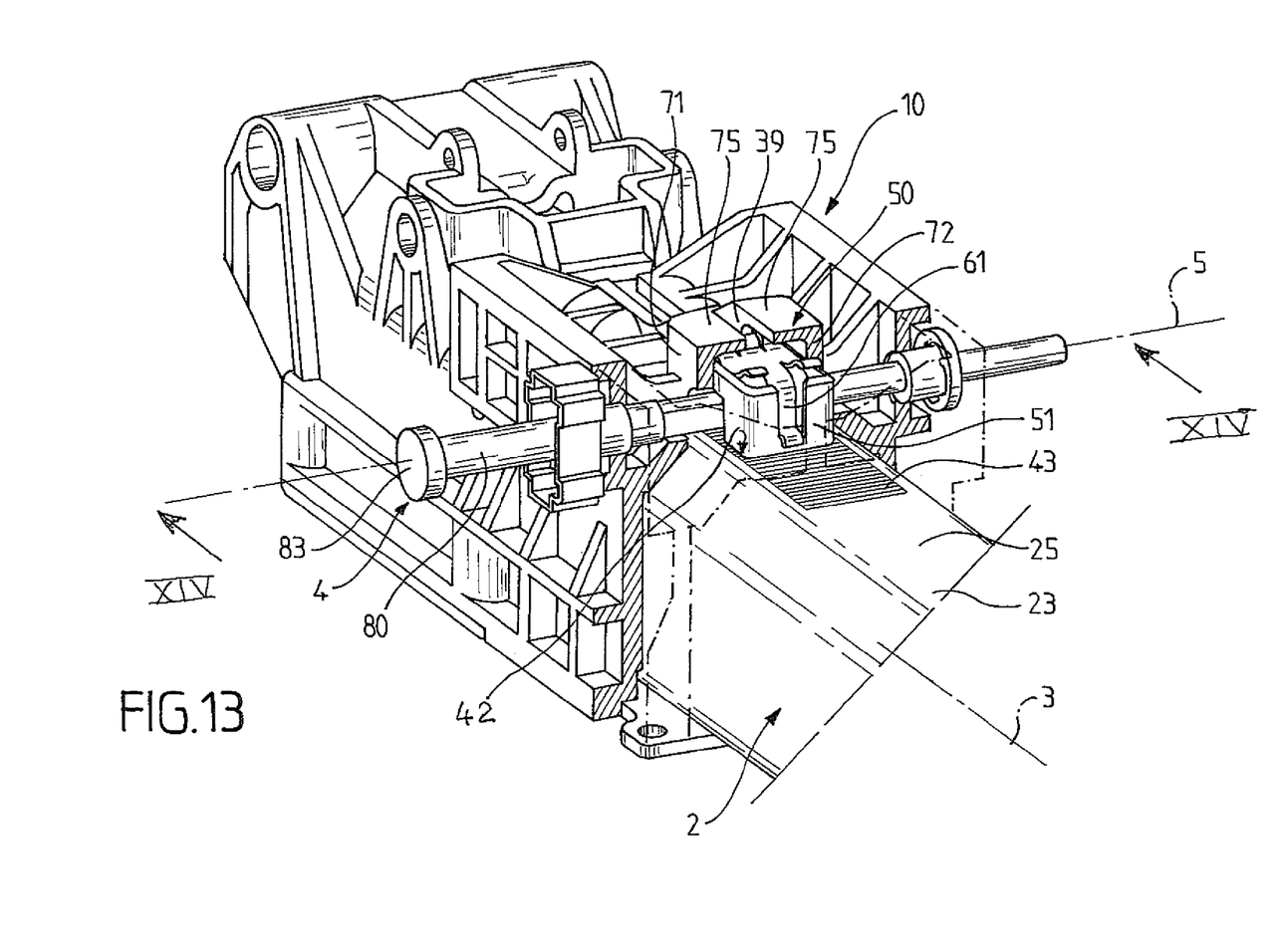
FIG. 13 is a partial view of FIG. 1, with various broken away parts to show in particular the intermediate carrier, the body tube with the clamping system and the press system.
Figure 14:
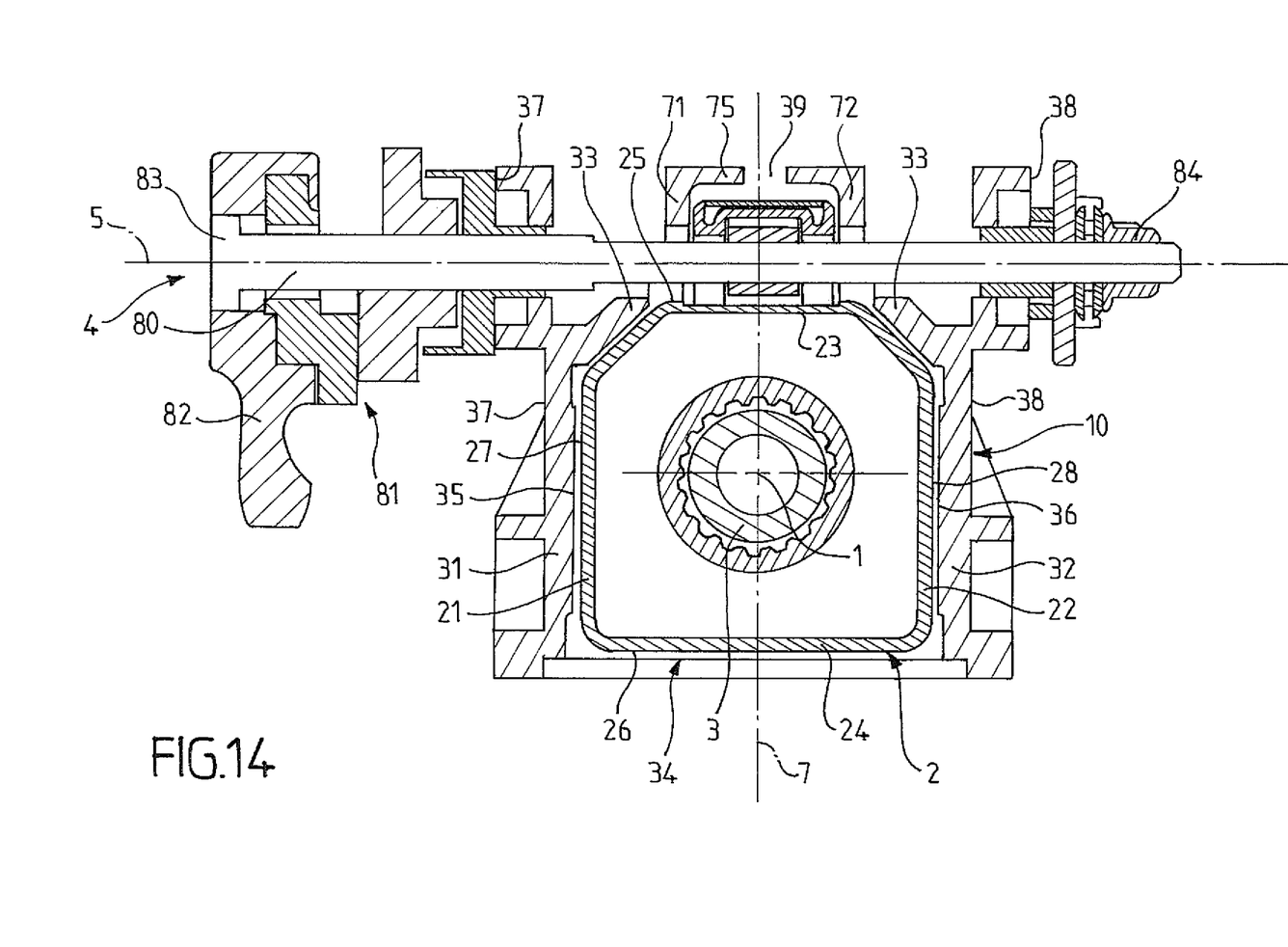
FIG. 14 is a section taken along the vertical plane containing line XIV-XIV of FIG. 13
Figure 15:
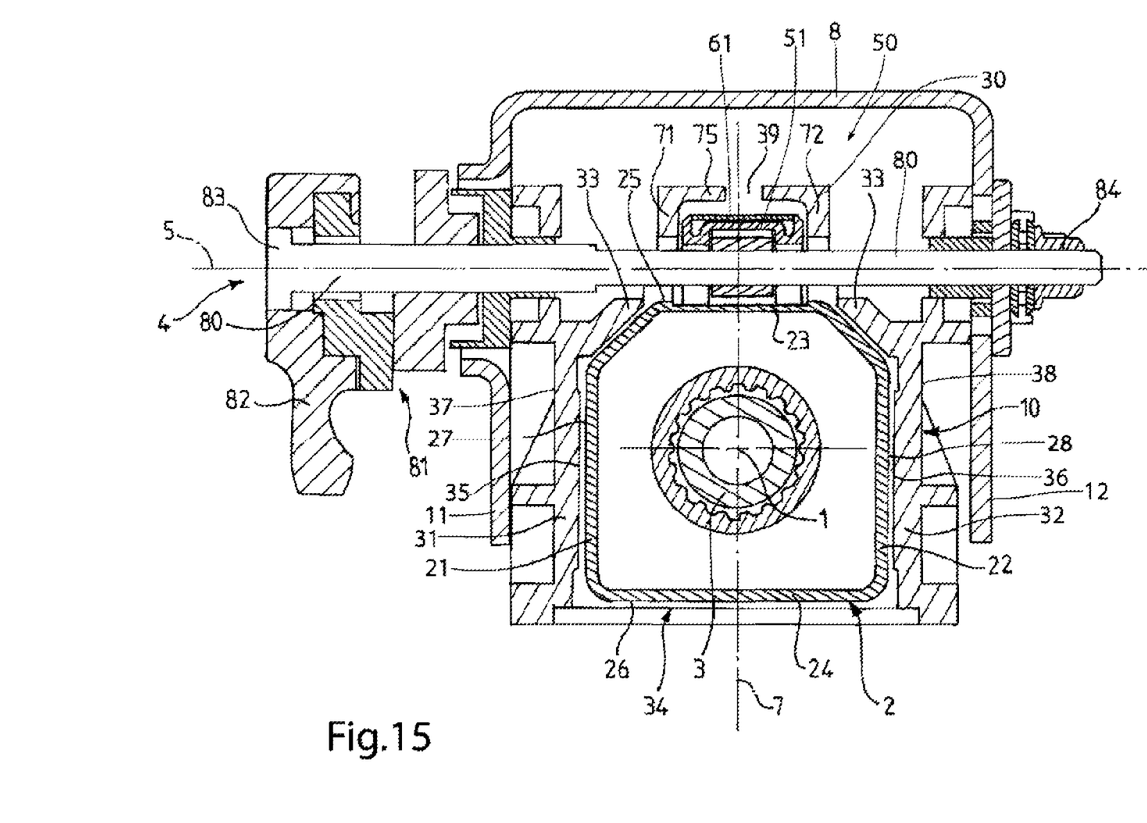
FIG. 15 is a sectional view taken along the vertical plane containing the line 15-15 of FIG. 1.

As shown in FIGS. 1, 13 and 14, the invention relates to a position-keeping device of a automotive vehicle steering column. The position-keeping device allows for energy absorption in the event of an impact, the development of which satisfies the requirements of the current vehicle. The steering column is adjustable either in depth or height, or both in depth and height.

The steering column includes a steering shaft 1 which is rotatably mounted about a steering axis 3. The steering shaft 1 is mounted in a body tube 2 located in the top part of the steering column. The steering shaft bears the steering wheel at one of its ends, and is connected to the intermediate shaft of the column at its other end. The steering column is mounted in a support assembly 6, which is fastened to the structure of the vehicle.

The support assembly 6 includes a fixed support member 8 and a movable support member 9. The body tube 2 is arranged in the movable support member 9 by means of an intermediate carrier 10. The body tube 2 is immobilized onto the fixed support member 8 in a locked position by a clamping system 4. Said clamping system 4 provides an unlocked position of the steering column for height and depth to be adjusted. The clamping system 4 is arranged on and acts along a clamping axis 5, which is substantially perpendicular to the vertical plane 7 passing through the steering axis 3.

The body tube 2 is mounted in the intermediate carrier 10, which is arranged in the fixed support member 8. The body tube 2 and the intermediate carrier 10 make up the movable support member 9. For the height to be adjusted, the whole movable support member 9 is moved with respect to the fixed support member 8; thus the word movable is only applied for the movement along the height of the steering column.

For the depth to be adjusted, the body tube 2 is moved along the steering axis 3, and is movable with respect to the intermediate carrier 10 that is fixed. In the event of an impact, the body tube 2 is movable along the steering axis 3, and moves with respect to the intermediate carrier 10, which is fixed and connected to the fixed support member 8 by the clamping system in a locked position. The energy absorption position-keeping device according to the invention is arranged between the body tube 2 and the intermediate carrier 10.

The fixed support member 8 is made up of two uprights 11 and 12, which are connected by a connecting member 13. The fixed support member 8 also includes a top plate fastened to the structure of the vehicle, and integral with the uprights 11 and 12 and the connecting member 13 as well. Both uprights 11 and 12 are substantially vertical, i.e. they are substantially parallel to the vertical plane 7 passing through the steering axis.

In the remainder of the description and for a same member, we will use the term "internal" or "internal" with respect to the steering axis 3 or with respect to the vertical steering plane 7, which means closer to this steering axis 3 or this steering plane 7, while the term "external" or "exterior" means farther away therefrom.

Thus, the upright 11 has an internal face 15 and an external face 17 with respect to the steering plane 7. Moreover, the upright 12 has an internal face 16 and an external face 18 with respect to this same steering plane 7. Said faces 15, 16, 17, 18 are substantially parallel to the vertical steering plane 7.

The intermediate carrier 10 is longitudinally bifurcated and is made up of two uprights 31 and 32 having connecting portions 33 defining a top part, and by a closing member 34 to define the bottom part. The upright 31 has an internal face 35 and an external face 37. Moreover, the upright 32 has an internal face 36 and an external face 38. Said faces 35, 36, 37, 38 are substantially parallel to the vertical steering plane 7.

The intermediate carrier 10 is mounted inside the fixed support member 8, both uprights 31 and 32 being arranged between both uprights 11 and 12. Moreover, the connecting portions 33 of the longitudinally bifurcated intermediate carrier 10 define an axial slot 39 wide enough to allow for both uprights 71, 72 of the connecting portions 33 to move closer upon clamping of the system. The body tube 2 is made up by two uprights 21 and 22, whose top portions are connected by a connecting member 23 and whose bottom portions are connected by a closing member 24. The upright 21 has an external face 27 and the upright 22 has an external face 28. Said external faces 27 and 28 are substantially parallel to the vertical steering plane 7 (FIG. 14). The connecting member 23 has an external face 25 and the closing member 24 has an external face 26.

The body tube 2 is mounted inside the intermediate carrier 10, both uprights 21 and 22 being provided between the two uprights 31 and 32. The body tube 2 and the intermediate carrier 10 are arranged so that both uprights 21 and 22 as well as both connecting member 23 and closing member 24 of the body tube 2 are properly guided by both uprights 31 and 32 and by both connecting member 33 and closing member 34 of the intermediate carrier 10.

The clamping system 4 includes a clamping rod 80, the axis of which is the clamping axis 5. The clamping rod 80 is mounted in the fixed support member 8, and passes through the intermediate carrier 10 above the connecting member 23 of the body tube 2. An immobilizing assembly 81, an operating lever 82 and an axial holding member 83 are mounted on one of the ends of the clamping rod 80. Said components 81, 82, 83 are provided on the same side of the vertical steering plane 7, and outside the carrier assembly 6, i.e. against the external face 17 of the upright 11 of the fixed support member 8. The axial holding member 83 is made up of a head of the clamping rod 80.

An axial holding member 84 (FIG. 14) is mounted on the other end of the clamping rod 80. The axial holding member 84 is provided on the other side of the vertical steering plane 7, and outside the support assembly 6, i.e. against the external face 18 of the upright 12 of the fixed support member 8. The axial holding member 84 is made up of a clamping nut which is to be mounted on the threaded end of the clamping rod 80.

According to the invention, the energy absorption position-keeping device, in the event of an impact, includes two meshing faces 40 and 41 which act one against the other, by means of a press system 50, that cooperates with the clamping system 4.

As shown in more details in FIGS. 2, 3, 4, 5, 6 and 7, the meshing face 40 is connected to the intermediate carrier 10, and is so-called fixed meshing face 40. Said fixed meshing face 40 is arranged on a keeping member 51 which is mounted in the intermediate carrier 10.

The meshing face 41 is connected to the body tube 2 and is so-called movable meshing face 41. Said movable meshing face 41 (FIG. 6) is arranged directly on the connecting member 23 of the body tube 2 and corresponds to the external face 25.

Figure 6:
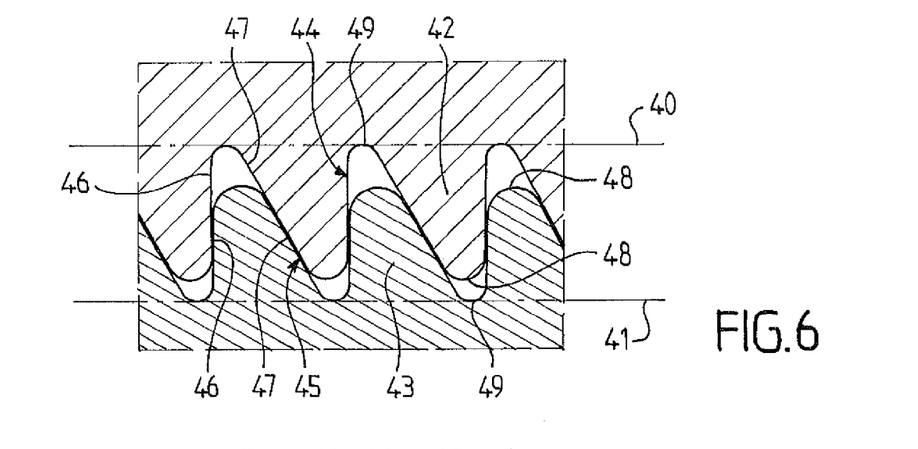
FIG. 6 is a partial section through the vertical steering plane of the teeth of both meshing faces according to the invention.

Both meshing faces 40 and 41 are substantially parallel to the steering axis 3, i.e. to the movement in the event of an impact. Both meshing faces 40 and 41 are engaged with each other by means of serrated protrusions 42 and 43, which are respectively arranged on the meshing faces 40 and 41, in order to be able to keep the position given by the locked position. The direction of the protrusions 42 and 43 is substantially perpendicular to the moving direction in the event of an impact, i.e. to the steering axis 3.

The protrusions 43 of the movable meshing face 41 have a profile along the vertical steering plane 7, that is conjugated with the profile of the protrusions 42 of the fixed meshing face 40.

The serrated protrusions 42 and 43 have shape characteristics, size characteristics and material characteristics which are defined such that in the event of an impact, the breaking force value of said protrusions 42 and 43 corresponds to a strain at the beginning of the retraction stroke that will have a predetermined value.

Figure 7:
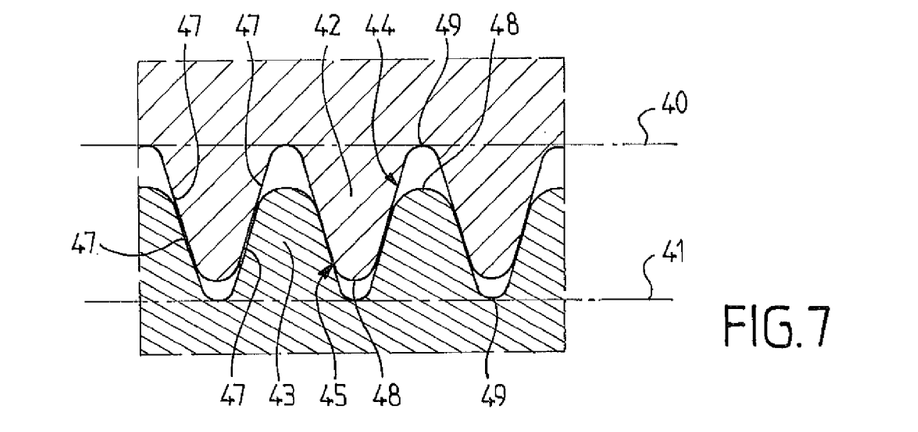
FIG. 7 is a section similar to FIG. 6 of another embodiment of the teeth.

According to an embodiment of the invention, the respective protrusions 42 and 43 of both meshing faces 40 and 41 are in the shape of teeth and will be called teeth 42 and 43. As shown in FIGS. 6 and 7, the teeth 42 and 43 are meshed within each other in a locked position. The direction of the teeth 42 and 43 is substantially perpendicular to the steering axis.

In FIG. 6, the teeth 42 and 43 have a profile along the vertical steering plane 7, which is made up of an upright flank 46 substantially perpendicular to the plane of the corresponding meshing face 40, 41, and of a flank 47 sloping with respect to said plane of the corresponding meshing face 40, 41. The apex 48 of each of the teeth 42 and 43 consists in a rounded portion between the upright flank 46 and the sloping flank 47 for the teeth to enter one into the other more easily. The bottom 49 of the teeth 42 and 43 consists in a rounded portion between the sloping flank 47 of a tooth and the upright flank 46 of the contiguous tooth.

In FIG. 7, the teeth 42 and 43 have a profile along the vertical steering plane 7, which is made up of two flanks 47 sloping with respect to the plane of the corresponding meshing face 40, 41. The apex 48 of each of the teeth 42 and 43 is made up of a rounded portion between both sloping flanks 47 for the teeth to enter one into the other more easily. The bottom 49 of the teeth 42 and 43 is made up of a rounded portion between the sloping flank 47 of a tooth and the sloping flank 47 of the contiguous tooth.

The position-keeping device of the invention includes the system 50 for pressing the meshing faces 40 and 41 one against the other, i.e. the teeth 42 and 43 inside each other. The pressing system 50 cooperates with the clamping system 4, so as to act in a locked position on the meshing faces 40 and 41 including the teeth 42 and 43, and to move the meshing faces 40 and 41 away from each other, i.e. the teeth 42 and 43 away from each other in an unlocked position.

Figure 2:
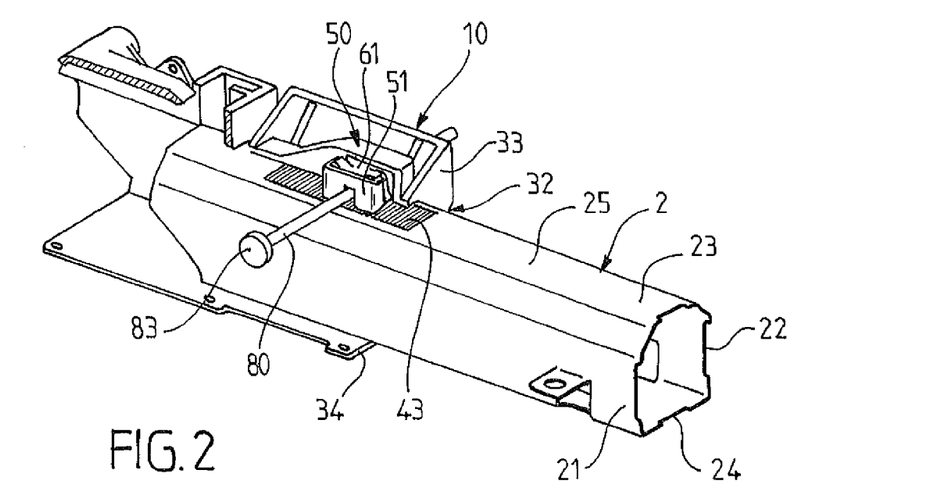
FIG. 2 is a partial view of FIG. 1, with various broken away parts to show in particular the body tube and the keeping member according to the invention.
Figure 3:
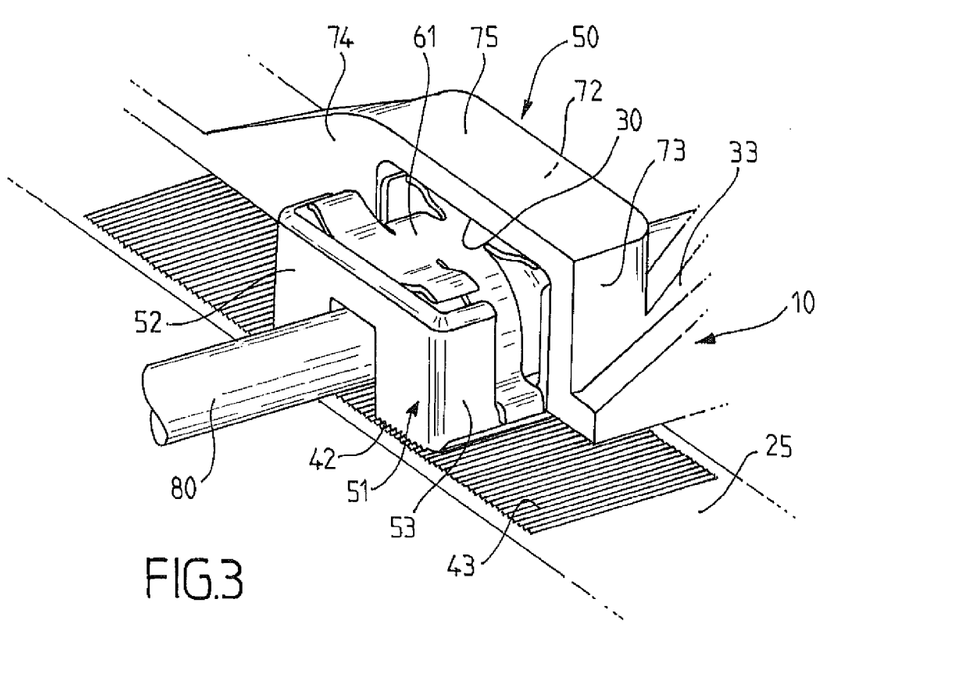
FIG. 3 is an enlarged view of FIG. 2.

The pressing system 50 is so-called press system 50. As shown in FIGS. 2 and 3, the clamping rod 80 passes through and cooperates with the keeping member 51 by means of the press system 50. The keeping member 51 is mounted in a housing 30 of the connecting member 33 of the intermediate carrier 10.

The press system 50 includes an elastic or resilient member 61 and a return member 67.

Figure 4:
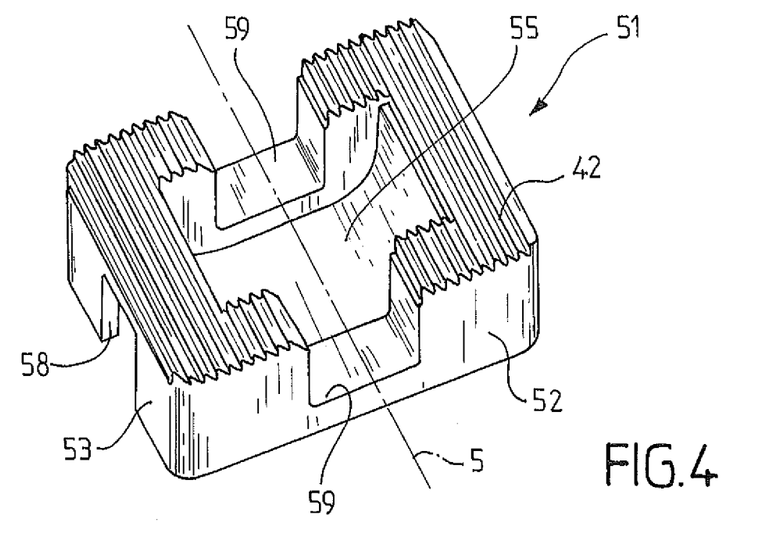
FIG. 4 is a bottom perspective view of the keeping member.
Figure 5:
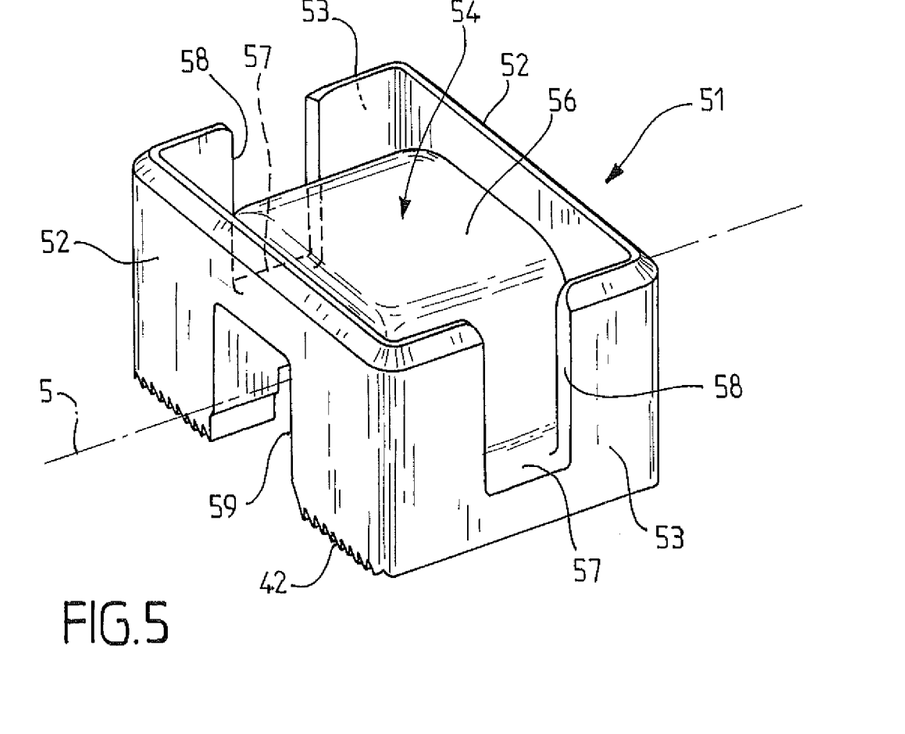
FIG. 5 is a top perspective view of the keeping member.

The keeping member 51 is shown in more details in FIGS. 4 and 5. The keeping member 51 is made up of a centre member 54 which is bounded by two axial uprights 52 and two transverse uprights 53. Both axial uprights 52 are parallel to each other, and parallel to the vertical steering plane 7, when the keeping member 51 is mounted in the intermediate carrier 10. Both transverse uprights 53 are perpendicular to the axial uprights 52 and parallel to the clamping axis 5.

The centre member 54 includes an external face and an internal face. The external face is made up of a centre bearing face 56 and two end bearing faces 57, which lead to the respective base of the two bearing notches 58 provided in both transverse uprights 53. The internal face makes up the bearing face of a housing chamber 55. A notch 59 is provided in each of the axial uprights 52, so as to enable the clamping rod 80 to pass through it. The internal face of the four uprights 52, 53 makes up the meshing face 40, which is provided with the teeth 42 parallel to the transverse uprights 53.

The keeping member 51 is mounted in the housing 30 of the connecting portions 33 of the intermediate member 10 shown in detail in FIGS. 2, 3 and 13-15. The housing 30 is made up of two longitudinal uprights 71 and 72 parallel to the vertical steering plane 7, and by two transverse uprights 73 and 74 normal to said vertical steering plane. The top portions of the uprights 71, 72, 73 and 74 are linked to two horizontal top wall portions 75.

The press system includes the elastic member 61 and the return member 67. The elastic member 61 is arranged in the housing 30, between the keeping member 51 and the bottom 75. The return member is arranged in the housing 55 of the keeping member 51 and mounted on the clamping rod 5. The elastic member 61 on the one hand bears against the bottom 75 of the intermediate carrier 10 and on the other hand, acts on the keeping member 51 in a locked position, in order to apply the meshing faces 40 and 41 one against the other, i.e. the teeth 42 and 43 against each other. The return member 67 bears against the internal face of the housing 55 of the keeping member 51 in an unlocked position, in order to move the meshing faces 40 and 41, i.e. the teeth 42 and 43, away from each other.

Figure 9:
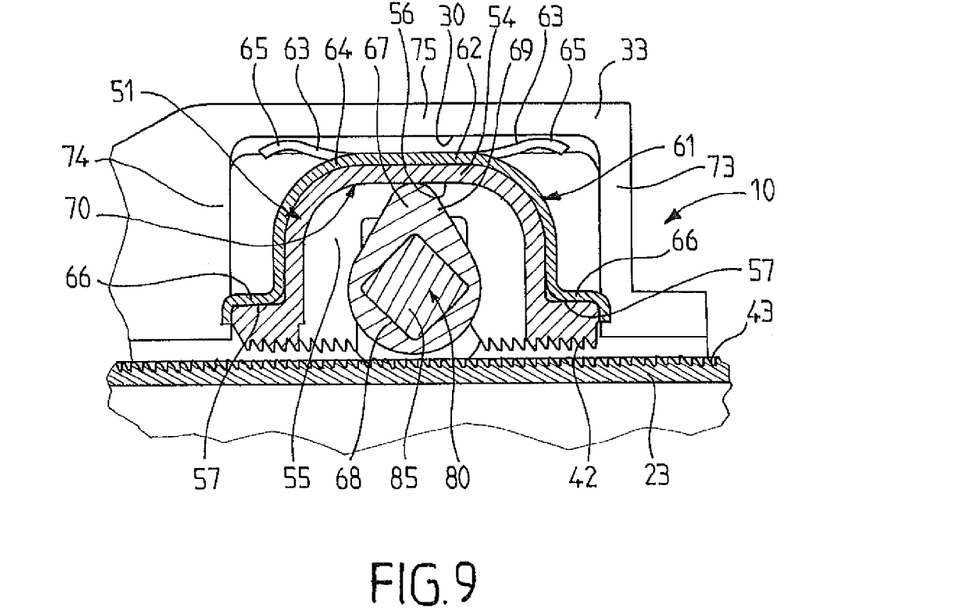
FIG. 9 is a partial section through the vertical steering plane of the press system of the invention, in an unlocked position.
Figure 10:
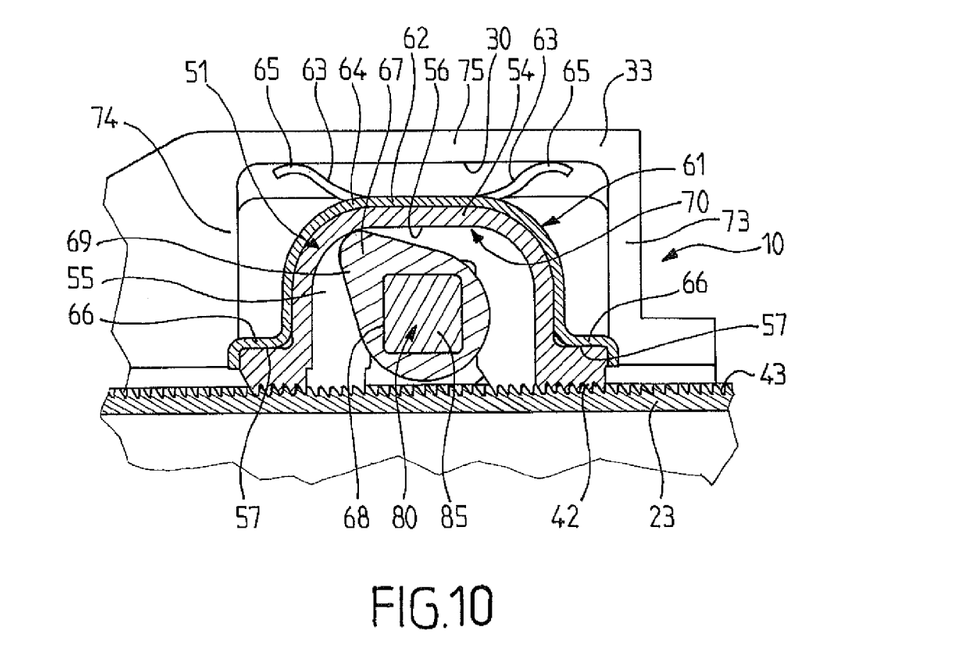
FIG. 10 is a section similar to FIG. 9, in a locked position.
Figure 11:
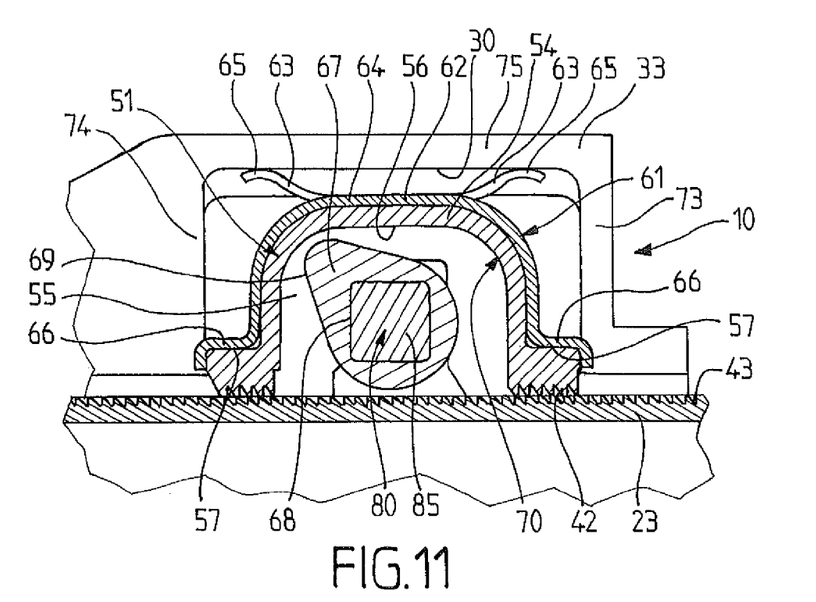
FIG. 11 is a section similar to FIG. 9, in a locked position in the tooth-on-tooth position.

The different positions of the elastic member 61 and the return member 67 are shown in FIGS. 9, 10 and 11.

The elastic member 61 is made up of a spring designated by 61, which bears against the bottom 75 and acts on the keeping member 51. The return member 67 is made up of a cam designated by 67, which is integral with the clamping rod 80 and disposed in the housing 55 of the keeping member 51.

Figure 8:
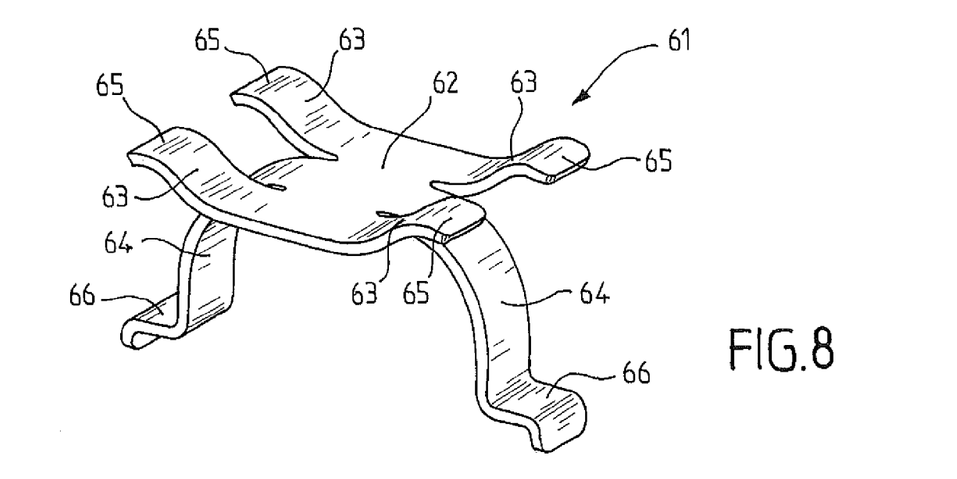
FIG. 8 is a perspective view of the spring of the press system according to the invention.

The spring 61 is shown in detail in FIG. 8. The spring 61 includes a base 62 with two centre branches 64 and four side branches 63, i.e. two side branches 63 on either side of the centre branches 64. Each of the side branches 63 is provided with an end 65, which bears against the bottom 75 of the housing 30 of the intermediate carrier 10. Each of the centre branches 64 is provided with an end 66, which bears against the corresponding bearing face 57 of the keeping member 51.

In one alternative embodiment of the invention non shown in the figures, the elastic member 61 is made up of one coiled spring or by plural coiled springs, or by one elastic washer or by plural elastic washers, which bear against the bottom 75 of the housing 30 of the intermediate carrier 10 and which act on the centre bearing face 56 of the keeping member 51.

The cam 67 is integral with the clamping rod 80 through a square section fitting, the cam 67 having a square section hole 68 and the clamping rod 80 having a square section 85 in the axial area including the cam 67, which passes through the keeping member 51 by the two passing-through notches 59. The cam 67 can also be made integral with the clamping rod by any other means.

The internal face of the housing 55 of the keeping member 51 has a vertical profile 70. The cam 67 has a vertical profile 69. The vertical profile 69 and the vertical profile 70 are determined so that, in an unlocked position (see FIG. 9), the cam 67 acts against the internal face of the housing 55 by compressing the spring 61 and moves the meshing faces 40 and 41 away from each other, i.e. the teeth 42 and 43; and in a locked position (see FIGS. 10 and 11), the cam 67 moves away from the internal face of the housing 55 and allows the spring 61 to act on the meshing faces 40 and 41, i.e. the teeth 42 and 43, that enter one into the other.

FIG. 11 shows the case of the locked position, in which the apexes of the teeth 42 and 43 face each other.

Figure 12:
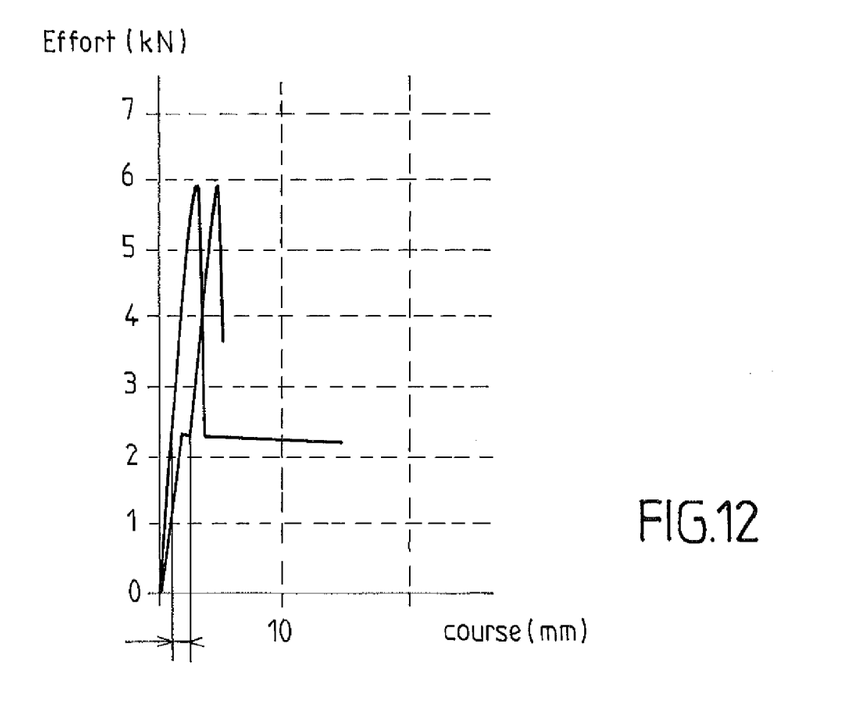
FIG. 12 shows the variation of the strain absorbed in the event of an impact depending on the steering wheel stroke.

FIG. 12 shows the strain peak offset when the apexes of teeth face each other. The specific device of the invention allows for a strain peak to be generated.

In the case of FIG. 11, the strain peak is offset at most by one tooth.

The device allows for a strain peak to be generated at the beginning of the retraction of the steering column in the event of an impact. This system allows for a constant strain peak to be obtained whatever the axial adjusting position of the column is. During an impact of the driver onto the steering wheel, the steering column is retracted under a controlled strain in order to absorb a predefined energy amount and thus restrict the impact effect on the driver. The body tube that is solidly linked to the steering wheel is axially moved inside the column body and generates strains through friction with the body. This strain associated with the stroke achieved results in a certain energy amount. The device described in this application enables, through a meshing of teeth, to generate an overstrain at the beginning of the retraction stroke of the column regardless of the axial adjusting position of the column. The strain peak level is given by the breaking level of the rack teeth. Once the rack teeth are broken, the column retraction occurs.

What is claimed is:

1. An automotive vehicle steering column arrangement that is adjustable in depth and/or height, comprising:
   (a) a fixed support assembly (6) including a fixed support member (8);
   (b) a movable support assembly (9) connected for movement relative to said fixed support assembly, said movable support assembly including:
      (1) a hollow carrier member (10);
      (2) a body tube (2) arranged for longitudinal displacement within said carrier member; and
      (3) a steering shaft (1) journalled in said body tube, said steering shaft having a steering axis (3); and
   (c) clamping means (4) for clamping said carrier member in a desired height position relative to said fixed support assembly, and for clamping said body tube at a desired longitudinal depth position relative to said carrier member; and (d) press means (50) connecting said body tube against longitudinal displacement relative to said carrier member, said press means including:
  (1) a housing (30) connected with said carrier member, said housing containing a chamber (55) opposite said body tube;
  (2) a keeping member (51) arranged in said housing chamber for displacement normal to said body tube;
  (3) two corresponding sets of serrated teeth (40, 41) arranged on the adjacent surfaces of said keeping member and said body tube, respectively, said sets of teeth extending generally parallel with said steering axis; and
  (4) spring means (61) biasing said keeping member toward said body tube, thereby to normally effect locking engagement between said sets of teeth;
  (5) said teeth having shape, size, and material characteristics which are so defined that said teeth have a predetermined breaking force value corresponding to a predetermined strain peak value on said steering column, wherein upon the application of an excessive impact force, said teeth will break at the beginning of a steering column retraction stroke, thereby allowing said body tube to move with respect to said carrier member in a direction parallel to said steering axis.

2. An automotive vehicle steering column arrangement as defined in claim 1, and further including release means (67) for displacing said keeping member away from said body tube against the biasing force of said spring means, thereby to effect disengagement of said sets of teeth.

3. An automotive vehicle steering column arrangement as defined in claim 2, wherein one set of said serrated teeth is arranged on the face of said keeping member.

4. An automotive vehicle steering column arrangement as defined in claim 3, wherein said other set of serrated teeth are arranged on an adjacent planar face of said body tube.

5. An automotive vehicle steering column arrangement as defined in claim 4, wherein said clamping means includes a clamping rod (80) having a clamping axis (5) that is normal to the vertical plane (7) containing said steering axis.

6. An automotive vehicle steering column arrangement as defined in claim 5, wherein said clamping means includes:
  (a) immobilizing means (81) including an operating lever (82) and a first axial holding member (83), which are mounted on one of the ends of the clamping rod and arranged on one side of the vertical steering plane and outside said fixed support assembly, and
  (b) a second axial holding member (84) mounted on the other end of said clamping rod and arranged on the other side of said vertical steering plane and outside said fixed support assembly.

7. An automotive vehicle steering column arrangement as defined in claim 6, wherein said fixed support member includes a pair of parallel spaced vertical side walls (11, 12), and a horizontal wall (13) connected between said side walls; and further wherein said carrier member is longitudinally bifurcated and includes a horizontal base portion (34), and a pair of vertical side walls (37, 38) adjacent the inner surfaces of said fixed support member side walls, respectively, each of said carrier member vertical side walls terminating at its upper end in a connecting portion (33) adjacent said tube body, said clamping rod passing through aligned openings contains in said fixed support member side walls and said connecting portions, said clamping rod being rotatable between a locked position in which said carrier member is clamped by said immobilizing means to said steering tube body and to said fixed support member, and an unlocked position in which said carrier member is released from said steering tube body and from said fixed support member.

8. An automotive vehicle steering column arrangement as defined in claim 7, wherein an axial said carrier member connecting portions have vertical extensions (71, 72) that define a longitudinal slot (39) wide enough to make it easier for said carrier member connecting portions to move closer upon clamping.

9. An automotive vehicle steering column arrangement as defined in claim 5, wherein said release means comprises a cam (67) mounted concentrically on and fastened to said clamping rod.

10. An automotive vehicle steering column arrangement as defined in claim 9, wherein said teeth of said sets are meshed with each other in said locked position and extend in a direction substantially perpendicular to said steering axis.

11. An automotive vehicle steering column arrangement as defined in claim 10, wherein said teeth have along a vertical plane a profile that comprises:
  (a) a generally upright flank (46); and
  (b) a sloping flank (47).

12. An automotive vehicle steering column arrangement as defined in claim 10, wherein said have along a vertical plane a profile that comprises two flanks (47) sloping with respect to each other.

13. An automotive vehicle steering column arrangement as defined in claim 12, wherein each tooth has:
  (a) an apex (48) with a rounded portion for said teeth to enter one into the other more easily, and
  (b) a bottom having a rounded portion (49) between said each tooth and a contiguous tooth.

14. An automotive vehicle steering column arrangement as defined in claim 9, wherein said spring means includes a spring member having a base with at least two side branches acting on faces of said housing chamber, and two center branches acting on two bearing faces of said keeping member.

15. An automotive vehicle steering column adjustable in depth and height, comprising:
  (a) a steering shaft rotatably mounted in a body tube for rotation about a steering axis;
  (b) a support assembly including a fixed support member and a movable support member made up of said body tube and of an intermediate carrier, said body tube being arranged in said intermediate carrier;
  (c) a clamping system including a clamping rod rotatable about a clamping axis substantially perpendicular to a vertical steering plane passing through said steering axis between a locked state and an unlocked state, wherein said clamping system in the locked state is such as to immobilize said intermediate support carrier in a locked position with respect to said fixed support member and as to clamp the body tube with respect to the carrier member and generate strain through friction between the carrier member and the body tube when the body tube moves axially relative to the carrier member during an impact,
    (1) said clamping system in the unlocked state allowing the intermediate carrier to move with respect to the fixed support member to adjust the height of said steering column with respect to said fixed support member,
    (2) said clamping system in the locked state keeping said intermediate carrier immobilized in said locked position during an impact;
  (d) an energy absorption position-keeping device including:

(1) a first meshing face fixed to said body tube and substantially parallel to the steering axis, (2) a second meshing face connected to said intermediate carrier and substantially parallel to the steering axis, (3) a press system cooperating with the clamping system for moving the second meshing face perpendicularly to the steering axis and to the clamping axis out of engagement with the first meshing face when the clamping system is in the unlocked state to allow said body tube to move with respect to said intermediate carrier parallel to said steering axis to adjust the depth of said steering column and in engagement with the first meshing face when the clamping system is in the locked state to press the first and second meshing faces against one another, (4) said first and second meshing faces in the locked state being engaged with each other by means of protrusions arranged respectively on said first and second meshing faces, (a) said protrusions having a direction substantially perpendicular to said steering axis, (b) said protrusions of said first meshing face having a profile in the vertical steering plane, which is conjugated with a profile of said protrusions of said second meshing face, (c) said protrusions having shape, size and material characteristics which are defined so that said protrusions have a predetermined breaking force value corresponding to a predetermined strain peak value on said steering column such that in the event of an impact, said protrusions break at the beginning of a steering column retraction stroke to allow said body tube to move with respect to said intermediate carrier parallel to the steering axis while the intermediate carrier remains stationary.

16. The automotive vehicle steering column arrangement of claim 15, wherein the clamping means comprises:

(1) an immobilizing assembly (81), an operating lever (82) and a first axial holding member (83), which are mounted on one end of the clamping rod and arranged on one side of the vertical steering plane and outside said support assembly; and (2) a second axial holding member (84) mounted on another end of said clamping rod and arranged on another side of said vertical steering plane and outside said support assembly.

17. The automotive vehicle steering column arrangement of claim 15, wherein the press system comprises:

(1) a housing connected with said intermediate carrier, said housing containing a chamber opposite said body tube; and (2) a keeping member movably arranged in said housing chamber for displacement normal to said body tube, the keeping member being provided with said second meshing face.

18. The automotive vehicle steering column arrangement of claim 17, wherein the press system further comprises:

(3) spring means biasing said keeping member toward said body tube, thereby to normally effect locking engagement between said protrusions; and (4) a return member for displacing said keeping member away from said body tube against the biasing force of said spring means, thereby to effect disengagement of said sets of teeth, wherein said return member comprises a cam mounted concentrically on and fastened to said clamping rod.

\* \* \* \* \*